US012728840B2

(12) United States Patent
Huisman

(10) Patent No.: US 12,728,840 B2
(45) Date of Patent: Sep. 8, 2026

(54) VEHICLE MOTION CONTROL

(71) Applicant: DAF Trucks N.V., Eindhoven (NL)

(72) Inventor: Rudolf Geert Maria Huisman, Helmond (NL)

(73) Assignee: DAF Trucks N.V., Eindhoven (NL)

(*) Notice: Subject to any disclaimer, the term of this patent is extended or adjusted under 35 U.S.C. 154(b) by 29 days.

(21) Appl. No.: 18/887,082

(22) Filed: Sep. 17, 2024

(65) Prior Publication Data

US 2025/0108790 A1 Apr. 3, 2025

(30) Foreign Application Priority Data

Sep. 29, 2023 (NL) ..................................... 2035927

(51) Int. Cl.
*B60W 30/09* (2012.01)
*B60W 10/04* (2006.01)
*B60W 10/18* (2012.01)
*B60W 10/20* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01); *B60W 60/001* (2020.02); *G06F 8/61* (2013.01); *B60W 2520/10* (2013.01); *B60W 2520/105* (2013.01); *B60W 2520/125* (2013.01);
(Continued)

(58) Field of Classification Search
None
See application file for complete search history.

(56) References Cited

U.S. PATENT DOCUMENTS 9,731,735 B1 8/2017 Nishinaga et al.
2007/0282513 A1* 12/2007 Michi ................ B60K 31/0008 701/96

(Continued)

FOREIGN PATENT DOCUMENTS

EP 3902734 B1 4/2022

OTHER PUBLICATIONS

Dutch Search Report and Written Opinion—App No. 2035927—mailing date Apr. 8, 2024.

*Primary Examiner* — Hunter B Lonsberry
*Assistant Examiner* — Robert L Pinkerton
(74) *Attorney, Agent, or Firm* — Banner & Witcoff, Ltd.

(57) ABSTRACT

A road vehicle is equipped with a generic vehicle motion planner and a vehicle type specific vehicle control interface module. This allows adapting the vehicle type independent path planning to a specific vehicle type. The generic vehicle motion planner determines a planned vehicle trajectory. The vehicle control interface module provides the generic vehicle motion planner with feasibility constraint information defining one or more feasibility constraints on accelerations of the vehicle along the planned vehicle trajectory. The feasibility constraint information is derived from vehicle configuration parameter values that may be sensed by further sensors. The generic vehicle motion planner determines a planned vehicle trajectory subject to the feasibility constraint on one or more accelerations of the vehicle along the planned vehicle trajectory. The vehicle control interface module converts plan based control information representing a planned acceleration from the generic vehicle motion planner to vehicle specific drive control signals.

15 Claims, 4 Drawing Sheets

(51) Int. Cl.
*B60W 60/00* (2020.01)
*G06F 8/61* (2018.01)

(52) U.S. Cl.
CPC ..... *B60W 2520/14* (2013.01); *B60W 2710/18* (2013.01); *B60W 2710/20* (2013.01)

(56) References Cited

U.S. PATENT DOCUMENTS

| | | | | |
|---|---|---|---|---|
| 2010/0211270 | A1* | 8/2010 | Chin | B62D 6/007 701/44 |
| 2018/0017971 | A1* | 1/2018 | Di Cairano | B62D 15/02 |
| 2018/0364703 | A1* | 12/2018 | Liu | G05D 1/617 |
| 2021/0197852 | A1* | 7/2021 | Fairfield | B60W 40/04 |
| 2022/0169247 | A1* | 6/2022 | Borrello | B60W 60/0011 |
| 2022/0185321 | A1* | 6/2022 | Bora | B60W 40/105 |
| 2022/0204017 | A1 | 6/2022 | Barton-Sweeney et al. | |
| 2023/0227067 | A1* | 7/2023 | Foster | B60W 30/0956 701/23 |
| 2023/0391324 | A1* | 12/2023 | Zarringhalam | B60W 30/12 |

* cited by examiner 14b
14a
28
26
24
22

VEHICLE MOTION CONTROL

CROSS REFERENCE TO RELATED APPLICATIONS

This application claims priority to Dutch patent application NL 2035927, filed Sep. 29, 2023, the content of which is hereby incorporated by reference in its entirety.

FIELD OF THE INVENTION

The invention relates to a road vehicle with an automated driving system, a method of automated driving of such a road vehicle, a method of installing an automated driving system in a road vehicle and a set of road vehicles with automated driving systems.

BACKGROUND

US20220204017 discloses a road vehicle with an automated driving system. Automated driving systems are configured to generate driving control signals such as powertrain control signals, brake control signals and steering control signals for a vehicle. A standardized hierarchy of degrees of driving autonomy provided by driving automation levels has been defined for automated driving systems, varying from control of a limited number of driving aspects under a limited number of circumstances to fully autonomous driving. An automated driving system may be configured to provide for one or more of such levels.

Generally, a road vehicle with an automated driving system has sensors, map data and vehicle information memory, and a computing module (usually called ECU=Electronic Computing Unit). The computing module computes the driving control signals from sensor based results, vehicle properties and map information. The computing module may use road information and sensor based results in combination with information about the geometry of the vehicle to select driving control signals that will realize movements that comply with road regulation and avoid collisions with other vehicles or static objects.

US20220204017 furthermore describes the determination of ranges (envelopes) of feasible accelerations from which the movements may be created. The envelope of feasible accelerations may depend on maximum available engine traction, braking force and steering capacity as well tire properties, the vehicle mass and its distribution and external factors like road surface orientation, road friction.

The computing module is configured to generate a traction generation profile to realize the desired movements of the vehicle while keeping the accelerations within the feasible envelope.

More generally, as used herein, the traction generation profile is an example of a representation of a planned vehicle movement trajectory. The vehicle movement trajectory may be computed repeatedly, e.g. periodically every second, and it extends at least from the present time over a future time interval in which the feasible envelope of the accelerations for the future affects the choice of planned accelerations for the present time. Usually such a feasible envelope remains the same along this future time interval.

The algorithms used in computing modules for computing the trajectory are generally very complex as they involve advanced sensor signal processing such as position detection, image object detection, sensor integration, collision avoidance, trajectory searching etc. Therefore, such computing modules are often designed by specialist teams, for multiple types of vehicle. This means that general assumptions about such types of vehicle must be imposed, and that information may not be used if it is available only in some specific types/brands of vehicle, and is not indispensable for automated driving.

SUMMARY

Among others, it is an object to provide for more flexible control of vehicles while using a generic vehicle motion planner that is not specific to the vehicle type and/or the configuration of the vehicle.

It is another object to provide for an Electronic Computing Unit (ECU) for use to provide more flexible vehicle trajectory control.

A road vehicle according to claim 1 is provided that comprises a powertrain, a brake system and a steering system.

Further, a generic vehicle motion planner is provided configured to plan, during driving, a vehicle trajectory for the vehicle subject to at least one variable feasibility constraint on one or more accelerations of the vehicle along the planned vehicle trajectory. The motion planner is further configured to output plan based control information representing one or more planned dynamic control parameters, e.g. longitudinal acceleration, velocity or trajectory curvature according to the vehicle trajectory. A vehicle control interface module is configured to supply drive control signals to at least one of the powertrain, brake system and steering system, based on the plan based control information. An adaptation control module is configured to use a vehicle dependent parameter value that is not used within the generic vehicle motion planner to determine the feasibility constraint information provided.

The adaptation control module makes it possible to use vehicle type and/or vehicle configuration specific parameters to set constraints on the path to be planned and to adapt drive control to different types of vehicle without need to adapt the design of the generic vehicle motion planner.

Adaptation to vehicle configuration parameters may have the additional advantage that it can provide for supplying better fitted feasibility constraints to the generic vehicle motion planner. Thus, it is not necessary to limit the range left by the feasibility constraints always for causes that occur only in exceptional vehicle or road configurations. Instead, the range left by the feasibility constraints supplied to the generic vehicle motion planner may be additionally narrowed only when such configurations occur, without unnecessarily limiting this range in other configurations. On the other hand problems due to permanent feasibility constraints that do not account for special configurations can be avoided. Adaptation to vehicle configuration parameters may be especially useful for truck-trailer(s) vehicles and/or in the case of significant mass changes due to different loads of such vehicles.

The constraint on one or more accelerations may be a maximum feasible longitudinal acceleration provided as the acceleration constraint from the adaptation control module to the generic vehicle motion planner. Alternatively or in addition, the constraint on one or more accelerations may be a maximum feasible lateral acceleration or yaw rate provided as the acceleration or yaw rate constraint from the adaptation control module to the generic vehicle motion planner.

In an embodiment one or more further sensor devices may be used by the vehicle control interface module to determine vehicle parameter values to set the constraint, wherein the further sensing devices may provide sensing results that have meaning specific to a particular type of vehicle only, without causing a need to adapt the design of the generic vehicle motion planner. For example, the further sensor device include an accelerometer, a strain gauge and/or a force sensor located on the vehicle or the further sensor devices include accelerometers, strain gauges and/or force sensors located respectively on different parts of the vehicle that are able to move relative each other. Typically, such sensor devices produce results whose meaning for driving is defined only for a specific type of vehicle, or even only to a specific vehicle, i.e. that are not generic to all types of road vehicles. In an embodiment, part or all of the measured vehicle specific parameter values used to set the constraint and/or convert to drive signals may be downloaded. This may make use of permanent sensors in the vehicle superfluous.

Not all vehicle parameter values that are used to set constraints require a (permanent) sensor device. In an embodiment, part or all of the measured vehicle specific parameter values used to set the constraint may be downloaded. This may make use of permanent sensors in the vehicle superfluous.

In an embodiment, the vehicle motion control interface module comprises a feedback loop that is configured to counteract a difference between an actual measured acceleration of the vehicle and the planned acceleration, i.e. a feedback loop following the generic vehicle motion planner. In this way, the planned accelerations can be followed more accurately.

It is possible to equip different road vehicles with identical generic vehicle motion planners and different vehicle motion control interface modules for adapting automated driving control of the road vehicles in a set of vehicles to the type of vehicle and/or to use of different vehicle dependent parameters. This makes it possible to simplify the design of automated driving by the vehicles.

A method of driving a road vehicle according to claim 15 is provided.

BRIEF DESCRIPTION OF THE DRAWINGS

These and other objects and advantages will become apparent from a description of exemplary embodiments with reference to the following figures.

DETAILED DESCRIPTION OF EXEMPLARY EMBODIMENTS

Figure 1:
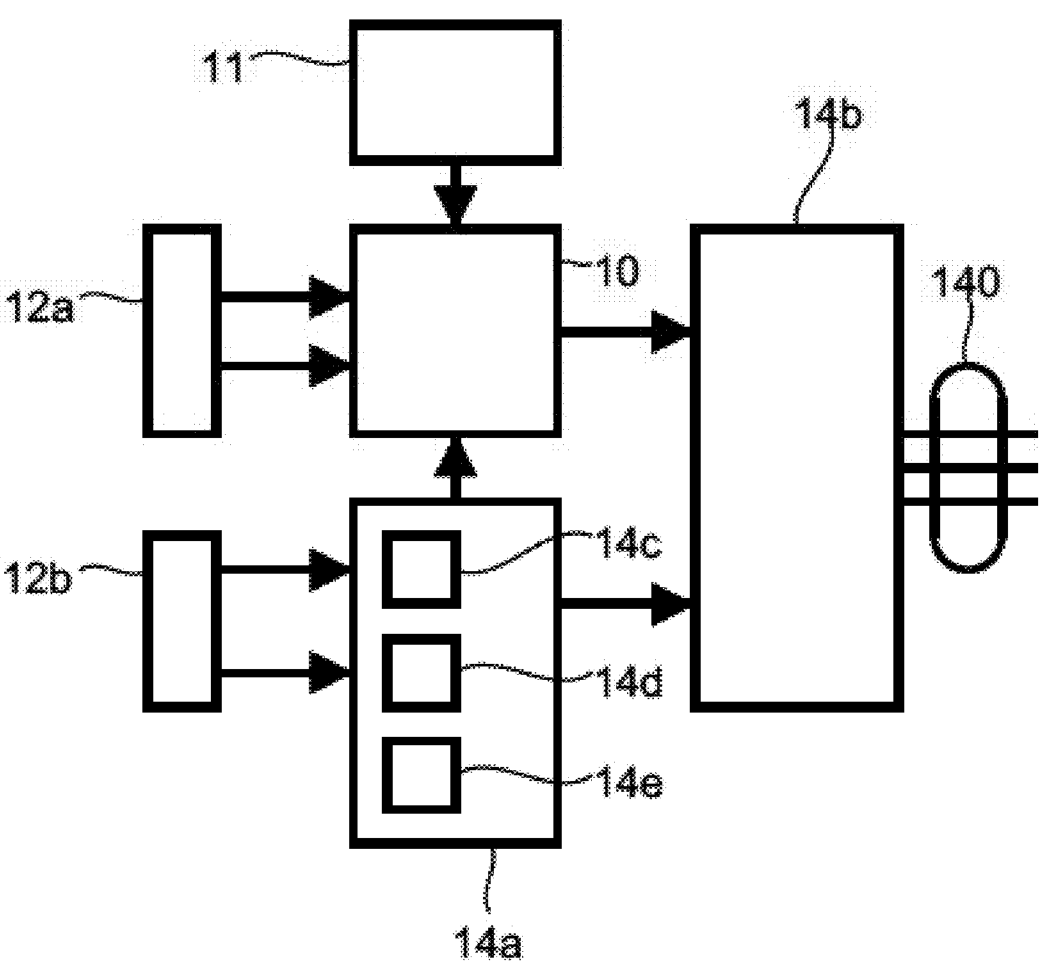
FIG. 1 shows an automated driving system

FIG. 1 shows an automated driving system comprising a generic vehicle motion planner 10, a memory 11, a first and second set of one or more sensing devices 12*a, b*, an adaptation control module 14*a*, estimators 14*c-e*, and a vehicle motion control interface module 14. Generic vehicle motion planner 10 is coupled to outputs of sensor devices in the first set of sensor devices 12*a* and adaptation control module 14*a* and to memory 11. Generic vehicle motion planner 10 has an output coupled to vehicle motion control interface module 14*b*. Adaptation control module 14*a* has inputs coupled to sensor devices in the second set of sensor devices 12*b*. In the illustrated embodiment, adaptation control module 14*a* comprises estimators 14*c-e*.

Although the couplings are shown as discrete lines, it should be realized that here and elsewhere in the figures, unless stated otherwise, each line may represent a plurality of conductors and/or different couplings may share the same conductor(s), such as in bus interfaces. In some cases, the lines within a component of the system may merely represent data dependence realized within a programmed computer used to implement that component. The generic vehicle motion planner 10 and adaptation control module 14*a* may be implemented as physically separate units, such as separate printed circuit boards.

Vehicle motion control interface module 14*b* has outputs 140 for supplying driving control signals such as powertrain control signals, brake control signals and steering control signals, to actuators (not shown) of a vehicle. Furthermore, adaptation control module 14*a* has inputs coupled to the second set of sensor devices 12*b*. As used herein, the term "sensor device" will be used both devices that sense physical parameters in the vehicle and receivers for receiving external information.

The sensor devices in the first set of sensor devices 12*a* may include sensing devices that are configured to produce sensing results that are defined generically for any vehicle, such as a speedometer, an accelerometer, an inclinometer, wheel direction sensors, one or more cameras, a Radar, a LIDAR, etc. Similarly, sensor devices 12*a* in the form of receivers for receiving external information produce results that are usually generic to any vehicle. This applies for example for receivers for receiving signals from road-side beacons and/or traffic information sources may be used. Sensor devices in the second set of sensor devices 12*b* may include sensor devices that are configured to produce sensor results that are useful only dependent on the context of specific vehicles, such as accelerometers on different parts of the vehicle that can move relative to each other, e.g. on a vehicle base and a sprung part of the vehicle. Furthermore, sensor devices in the second set of sensor devices 12*b* may include wheel rotation sensors, and strain gauges or force sensors for measuring forces transmitted by different parts of the vehicle e.g. by individual axles or wheels.

The sensor devices in the second set of sensor devices 12*b* may be coupled to inputs of part or all of estimators 14*c-e*, in order to estimate vehicle parameters based on sensor results. Optionally, one or more sensor devices may be coupled to both generic vehicle motion planner 10 and adaptation control module 14*a*, to plan the vehicle's trajectory and, in the case of adaptation control module 14*a*, to assist in parameter estimation.

Optionally, the automated driving system may additionally or alternatively comprise a download interface (not shown) coupled to adaptation control module 14*a* for entering measured values of one or more vehicle specific parameters into a memory in the vehicle, from which one or more of estimators 14*c-d* may be configured to read parameter values for use in adaptation control module 14*a* as described in the following. This can be used for parameters that do not change dynamically. In this way no permanent sensor is needed in the vehicle: instead an external sensor may be used. The download interface may be a wired or wireless interface or a device with a user interface, such as a keyboard in the vehicle, for entering the values.

Generic Motion Planning

Generic vehicle motion planner 10 is configured to process signals from the first set of sensor devices 12*a* that produce sensor results that are defined generically for any vehicle. The sensor results used include the locations and/or velocity of objects such as other road users and obstacles, in order to detect objects that may potentially collide with the vehicle. Similarly, generic vehicle motion planner 10 may be configured to use the sensor devices to detect road boundaries and traffic signs, in order to obtain information about allowable vehicle movements. Furthermore, generic vehicle motion planner 10 may be configured to use the detected location, movement direction and/or velocity of the vehicle.

Generic vehicle motion planner 10 is configured to receive feasible acceleration constraint information that defines time-variable ranges of feasible acceleration values (e.g. in terms of time-variable maximum or minimum values of such ranges) from adaptation control module 14*a*. To do so, generic vehicle motion planner 10 may be configured to call for feasible acceleration constraint information obtained from adaptation control module 14*a*, or adaptation control module 14*a* may push this information.

The acceleration values may include longitudinal acceleration of the vehicle and rotation rate or lateral acceleration (as used herein "acceleration" will also be used to refer to deceleration, i.e. negative acceleration as well as the rotation rate, of any quantity, including longitudinal and lateral motion and yaw).

Generic vehicle motion planner 10 is configured to select at least a short-term planned vehicle trajectory for the vehicle on a straight road section or in a road bend or road crossing that complies with road regulation and optionally avoids collisions with detected potentially colliding objects, and to supply acceleration signals that define planned dynamic control parameter values for longitudinal, lateral and driving direction according to the planned vehicle trajectory to vehicle motion control interface module 14*b*. Preferably, generic vehicle motion planner 10 does so using only sensor results that are defined generically for any type of road vehicle on wheels, without directly using sensor results that have context dependent meaning. The operation of generic vehicle motion planner 10 depends at most indirectly on the latter type of sensor results, via the feasible acceleration constraint information.

The trajectory may be represented in terms of time dependent acceleration values, motion values, and/or location values, e.g. as a series of values for successive time points. Generic vehicle motion planner 10 is configured to select the vehicle trajectory based on geometric information that defines the shape of the vehicle, the detected locations and/or velocity of potentially colliding objects such as other road users, traffic signs and feasible acceleration constraint information.

In addition, generic vehicle motion planner 10 may be configured to select a long term planned path to a destination over successive roads, bends and crossings and to the vehicle's destination based on map data. Vehicle motion planners for computing both short-term and long term planned paths are well known per se. For example, generic vehicle motion planner 10 may select a short-term vehicle trajectory by generating possible trajectories on a road and testing these possible trajectories for compliance with collision avoidance and the feasible constraint information until a compliant possible trajectory is found.

Vehicle motion planner 10 is referred to as a "generic" vehicle motion planner for a set of different vehicle types in the sense that its feasible acceleration constraint information input and acceleration signal output typically (see further below) represent the accelerations independent of the specific type of the vehicle in which generic vehicle motion planner 10 is used (e.g. in terms of accelerations rather than information that depends on the actual powertrain, brakes and steering device used in a specific vehicle other than through the received feasible acceleration constraint information). Generic vehicle motion planner 10 may be further generic in terms of restrictions on the set of vehicle features that it uses to plan the vehicle trajectory. Adaptation control module 14*a* functions to make vehicle motion control dependent on the type of vehicle in which the automated driving system is located, or even to the individual vehicle. This may involve using vehicle properties or data from sensor devices that are not used by generic vehicle motion planner 10. For example, this may involve properties that are not available for all types of motor vehicles (or at least four-wheeled road motor-vehicles) in the set of vehicle types for which generic vehicle motion planner 10, and/or using data from sensors that are not available for all types of motor vehicles (or at least four-wheeled road motor-vehicles) in the set.

The vehicle trajectory planned by generic vehicle motion planner 10 depends on the specific type of vehicle only through input from adaptation control module 14*a*, e.g. of feasible range constraints on the longitudinal acceleration, the lateral acceleration and/or the rate of change of the driving direction. Adaptation control module 14*a* may be used to determine the feasible range constraints dependent on specific configuration properties of the vehicle type, or even a specific vehicle of that type. The desired acceleration values according to the vehicle trajectory as defined by the output of generic vehicle motion planner 10 are used by vehicle motion control interface module 14*b* to generate the driving control signals dependent on the vehicle type in which it is used, or even a specific vehicle of that type.

These operations of adaptation control module 14*a* may involve dependence on vehicle features that are not commonly available and/or relevant for all vehicle types in the set of vehicle types for which generic vehicle motion planner 10 is generic.

Generic vehicle motion planner 10 is suitable for use without alteration in vehicles of different types from a set of different vehicle types. Adaptation control module 14*a* is configured to make the automated driving system specific to one, or a sub-set of these vehicle types, or even to a specific vehicle, and/or to specific configuration of vehicle the vehicle including its load.

Thus, by installing generic vehicle motion planner 10 in vehicles of any vehicle type from the set of different vehicle types, and adding, and if desired configuring, an adaptation control module 14*a* dependent on the vehicle type of the vehicle in which it is installed, the automated driving system in the vehicle can be adapted without requiring modification of generic vehicle motion planner 10.

Vehicle Specific Adaptation

Figure 2:
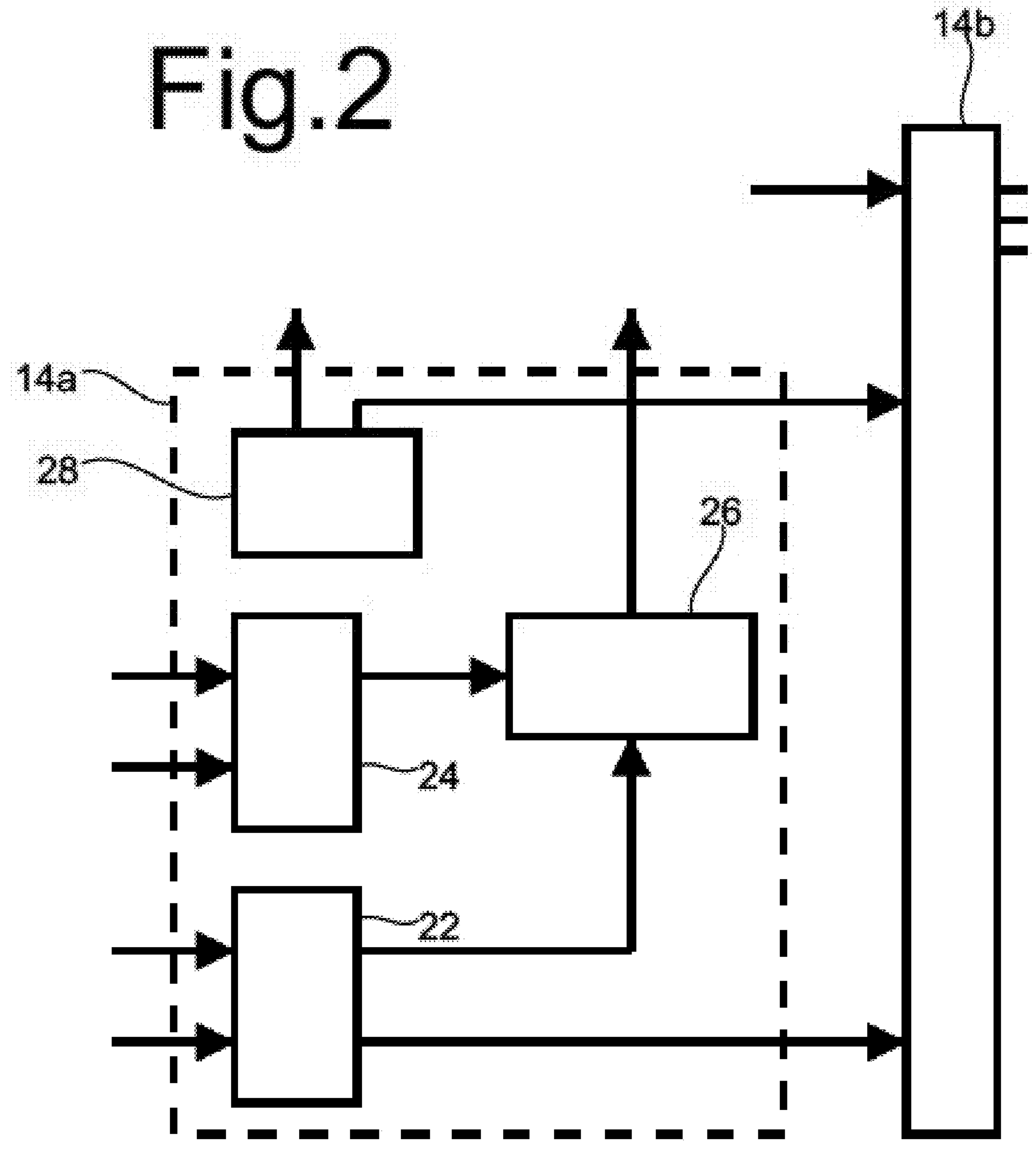
FIG. 2 shows a vehicle motion control interface module

FIG. 2 shows adaptation control module 14*a*, and vehicle motion control interface module 14*b*. Adaptation control module 14*a* comprises a vehicle parameter estimator 22, a road parameter estimator 24, a control feasibility detector 26 and a memory 28. Memory 28 stores values of general, e.g. static, vehicle parameters for use by the other components of vehicle control interface module 14 and/or for supply to generic vehicle motion planner 10.

In an embodiment, adaptation control module 14*a* may be implemented using a programmed computer. For such an embodiment, the boxes in the figure represent sub-program and the lines within the figure represent data transfer to, from and between the sub-programs. For the sake of description the figure will be explained with the boxes as devices.

Vehicle motion control interface module 14*b* has inputs for receiving information about the planned vehicle trajectory, e.g. in the form of desired acceleration or deceleration values of the vehicle speed in the longitudinal direction for a next time point, as well as trajectory curvature from the generic vehicle motion planner (not shown). Instead or in addition the planned speeds for the next time point may be supplied. Adaptation control module 14*a* feeds these inputs to vehicle motion control interface module 14*b*, which acts as an interface motion controller, which is configured to use this information and further information to generate the driving control signals at outputs 140.

Vehicle parameter estimator 22 and road parameter estimator 24 may have inputs coupled to sensors and/or receivers (not shown) or may have memories for received parameter values such as weight and weight distribution of the vehicle, tire pressure, understeer gradient, road load, road slope, road friction, etc. In the illustrated embodiment, vehicle parameter estimator 22 and road parameter estimator 24 are configured to feed estimated vehicle and road parameters as further information to generate the driving control signals to vehicle motion control interface module 14*b* as well as control feasibility detector 26.

Control feasibility detector 26 is configured to compute the feasible acceleration constraint information that adaptively defines ranges of feasible acceleration values based on the estimated parameters. For example, the feasible acceleration constraint information may define time-variable maximum values of longitudinal acceleration, longitudinal deceleration, and maximum lateral acceleration.

The vehicle dependent parameter value(s) that the adaptation control module configured uses to determine the feasibility constraint information may include configuration parameter value(s) of the vehicle as a whole, or of different parts of the vehicle, such as a chassis, a sprung part and/or a trailer), understeer gradient, as well as parameters of the road at the location of the vehicle. The parameters may include static mass or mass distribution parameters, one or more components of the center of gravity of the vehicle (height, longitudinal displacement and/or lateral displacement).

The computation of feasibility constraint information from vehicle dependent parameter value(s) is known per se. For example, when a vehicle can only provide up to a maximum traction or braking force, this can be combined with the mass of the vehicle to compute acceleration constraints. Furthermore, the mass may affect the maximum lateral acceleration.

The masses of different parts of the vehicle, combined with the location of the wheels and the brakes may be used to compute acceleration constraints. Similarly, the height of the center of gravity can be used to compute acceleration constraints on the lateral or longitudinal acceleration of the vehicle. This may also depend on the longitudinal displacement of the center of gravity. Similarly, components of the displacement of the center of gravity of different components of the vehicle can be used to compute acceleration constraints or limits on the curvature of the trajectory.

The estimators may be configured to compute estimations of the vehicle and road parameter value(s) from sensor results. Thus, for example, static mass or mass distribution estimates and estimates of components of the center of gravity may be based on measured static forces (e.g. strain) on a plurality of locations on the vehicle or on static inclination. Similarly road slope may be measured using an inclinometer or an accelerometer.

The sensor devices in the second set may include an accelerometer, strain gauge and/or a force sensor located on the vehicle. More than one sensor device selected from accelerometers, strain gauges and/or force sensors may be used located respectively on different parts of the vehicle that are able to move relative each other.

Typically, such sensor devices produce results whose meaning for driving is defined only for a specific type of vehicle, or even only to a specific vehicle, i.e. that are not generic to all types of road vehicles. The estimators may be used to convert such sensor results into estimates of physical vehicle parameters. Again, this may be especially useful for adapting constraints of motion planning for truck-trailer vehicles and/or in the case of significant mass changes due to different loads of such vehicles.

Detailed Examples of Constraint Computation

As one example, the feasible acceleration constraint information may define a variable maximum value A1_max of longitudinal acceleration. Several A1_max values may be defined, in which case the lowest A1_max value may be used. One A1_max of the vehicle may be derived from the maximum drive force that can be provided by the powertrain divided by the vehicle mass M. For a truck with an appended trailer with combined mass M on a longitudinally upward inclined road a lower maximum A1max be computed from $$A1\_max = (Fdrive - Froll - g * M * \sin(\text{inclination}))/M$$

Herein Fdrive is the maximum force that can be exerted by the wheels of the truck, g*M*sin (inclination) is the longitudinal component of the force of gravity on the vehicle due to the longitudinal inclination of the road and Froll is the sum of the longitudinal rolling force exerted on the truck, by the wheels of the truck and trailer. Fdrive may be expressed as Fdrive=mu*Fn, dependent on the friction coefficient mu of the road and the force component Fn normal to road of the force by the driven wheels of the truck on the road. Froll=g*M*Croll is the total vehicle roll resistance. The total mass may be determined from a sum of measured vertical forces measured by force sensors on the individual wheels or axis. The inclination may be measured by an accelerometer on the vehicle.

As may be noted, this maximum value A1_max depends on the estimated mass distribution between truck and trailer and the estimated total rolling resistance force of the tractor and trailer wheels e.g. in view of estimated slip force of the trailer wheels, which are specific to the truck-trailer vehicle, and hence are not used directly in generic vehicle motion planner 10: they are used only via the A1_max from adaptation control module 14*a*. The specific vehicle may have sensors (e.g. an accelerometer) to estimate road inclination and/or the friction coefficient mu. Adaptation control module 14*a* may use estimates derived using these sensors to compute A1max, whereas generic vehicle motion planner 10 has no provisions to use such sensors.

As another example, the time-variable feasible acceleration constraint information may define a time-variable maximum value of lateral acceleration, which defines the lateral acceleration above which the vehicle risks roll over. For this, a distinction can be made between a total mass M and a sprung mass Mch that can move on the vehicle's springs, and the heights H, Hch of the center of mass of these masses. The maximum value of lateral acceleration A2_max may be computed from and/or $$A2\_max = g * (S/2H)/(1 + A/(1 - A) + B)$$

Herein S is the lateral distance between the wheels, H is the height of the center of gravity of the vehicle above the road and g is the acceleration of gravity. The correction terms A and B can be expressed as $$A = M * g * H/(S * S * Kt)$$

$$B = (Ms/M) * (H'/H) * u/(1 - u)$$

Herein Kt is the tire stiffness. H' is the difference H'=Hch−Hroll between the sprung height Hch of the sprung mass Mch and the height Hroll of the roll center above the road. u=g*Mch*H'/C, wherein C is the total vehicle roll stiffness.

As may be noted, the maximum A2_max depends on the spring parameters of the vehicle, which are specific to the vehicle, and are not used directly in generic vehicle motion planner 10.

It should be noted that the fact that adaptation control module 14*a* determines constraints does not exclude that generic vehicle motion planner 10 itself creates additional constraints. For example, when generic vehicle motion planner 10 searches for the vehicle trajectory, the acceleration range can be used to determine a speed constraint, e.g. of the longitudinal velocity Vlong, where the planned vehicle trajectory has a curvature Rp:

$$Vlong < sqrt(\text{A2\_max}/Rp)$$

As a further example, the time-variable feasible acceleration constraint information may define a time-variable maximum vehicle yaw rate Ymax that is feasible without jack-knifing a trailer-truck combination, or unstable oversteering.

When generic vehicle motion planner 10 searches for the vehicle trajectory, the maximum vehicle yaw rate Ymax can be used to determine a speed limitation, e.g. of the longitudinal velocity Vlong, where the planned vehicle trajectory has a curvature Rp $$Vlong < Ymax / Rp$$

Motion Control

Figure 3:
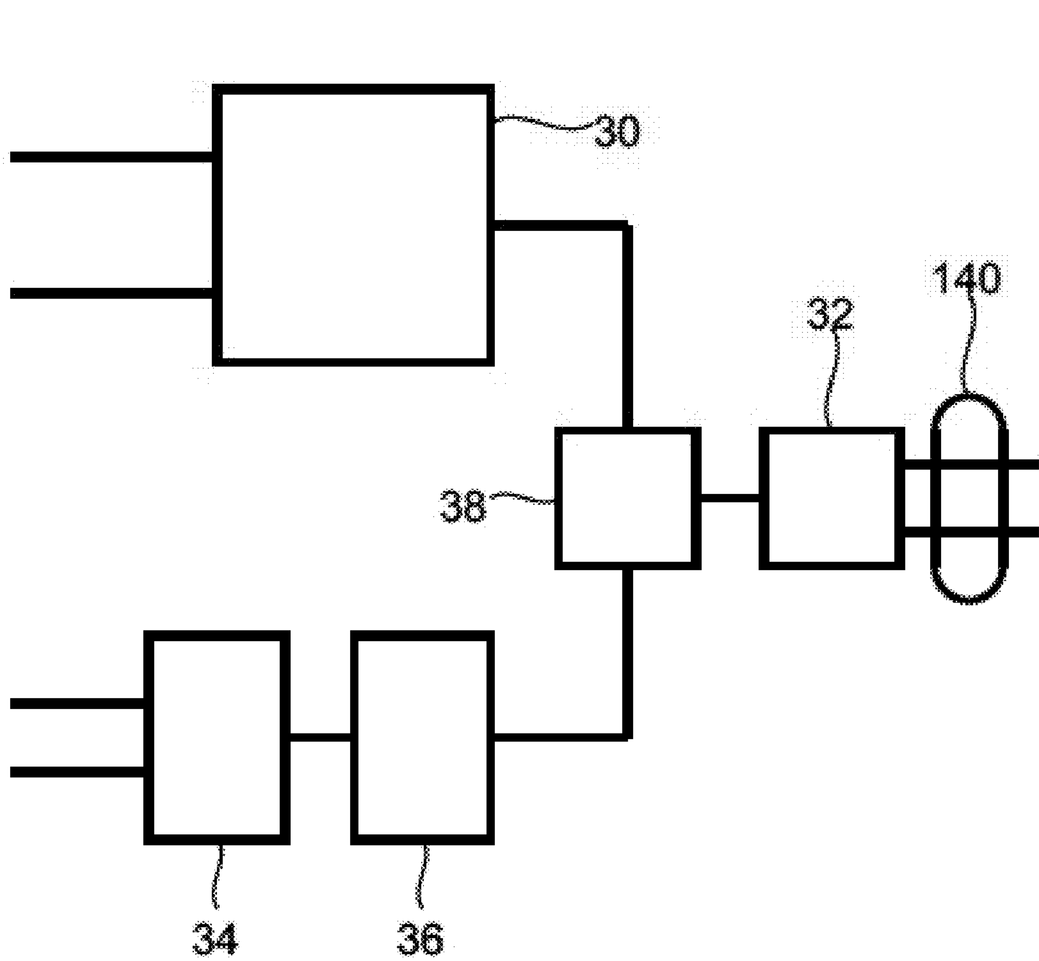
FIG. 3 shows a longitudinal motion controller

FIG. 3 shows an example of a longitudinal motion controller in vehicle motion control interface module 14*b*, comprising a feed-forward controller 30, a subtractor 34, a feedback controller 36, a combiner 38 and an actuator selector 32.

In an embodiment, the longitudinal motion controller may be implemented using a programmed computer. For such an embodiment, the boxes in the figure represent sub-program and the lines within the figure represent data transfer to, from and between the sub-programs. For the sake of description the figure will be explained with the boxes as devices.

Feed-forward controller 30 has inputs for receiving the longitudinal acceleration value according to the planned vehicle trajectory, (estimated) vehicle parameters and optionally road parameters. Subtractor 34 has inputs coupled to the input for receiving the longitudinal acceleration value according to the planned vehicle trajectory and an output of an acceleration sensor or estimator (not shown). An output of subtractor 34 is coupled to feedback controller 36. Outputs of feed-forward controller 30 and feedback controller

36 are coupled to combiner 38, which may be an adder. Actuator selector 32 has an input coupled to combiner 38 and outputs for controlling the engine, or engines of the vehicle and its brakes.

Feed-forward controller 30 is configured to compute a required torque from the longitudinal acceleration value according to the planned vehicle trajectory. On a flat road the computed torque value may be proportional to the acceleration according to the planned vehicle trajectory, with a proportionality constant that is a factor times the mass of the vehicle. Feed-forward controller 30 may use further vehicle parameters and road parameters to adjust the proportionality constant to more complicated road conditions, such as a sensed road slope.

Feedback controller 36 is configured to compute a torque correction based on the deviation between the longitudinal acceleration value according to the planned vehicle trajectory and the measured longitudinal acceleration of the vehicle.

Proportional control or a more advanced form of PID control may be used (noting that the velocity is the integral of the acceleration, so that the integrating function of the PID control of feedback controller 36 may be implemented using a difference between the longitudinal velocity according to the planned vehicle trajectory and the measured velocity).

In addition, feedback controller 36 may make use of vehicle specific parameters such as vehicle mass and sensed traction torque may be used to adapt the feedback, e.g. feedback gain and/or bandwidth, to ensure feedback stability and/or optimize response time, or other feedback properties. Generic vehicle motion planner 10 is not involved by this, other than that it supplies the longitudinal acceleration according to the planned vehicle trajectory.

Combiner 38 combines the feed-forward computed torque and feedback control torque correction, e.g. by (weighted) addition. Actuator selector 32 is configured to use the combined torque and torque correction to select an actuator to generate this torque, and to transmit a control signal based on the combined torques to the selected actuator (not shown), i.e. to the braking system of the vehicle or the motor, or, if both an E-motor and a combustion motor are available, to a selected one or both of these motors.

Figure 4:
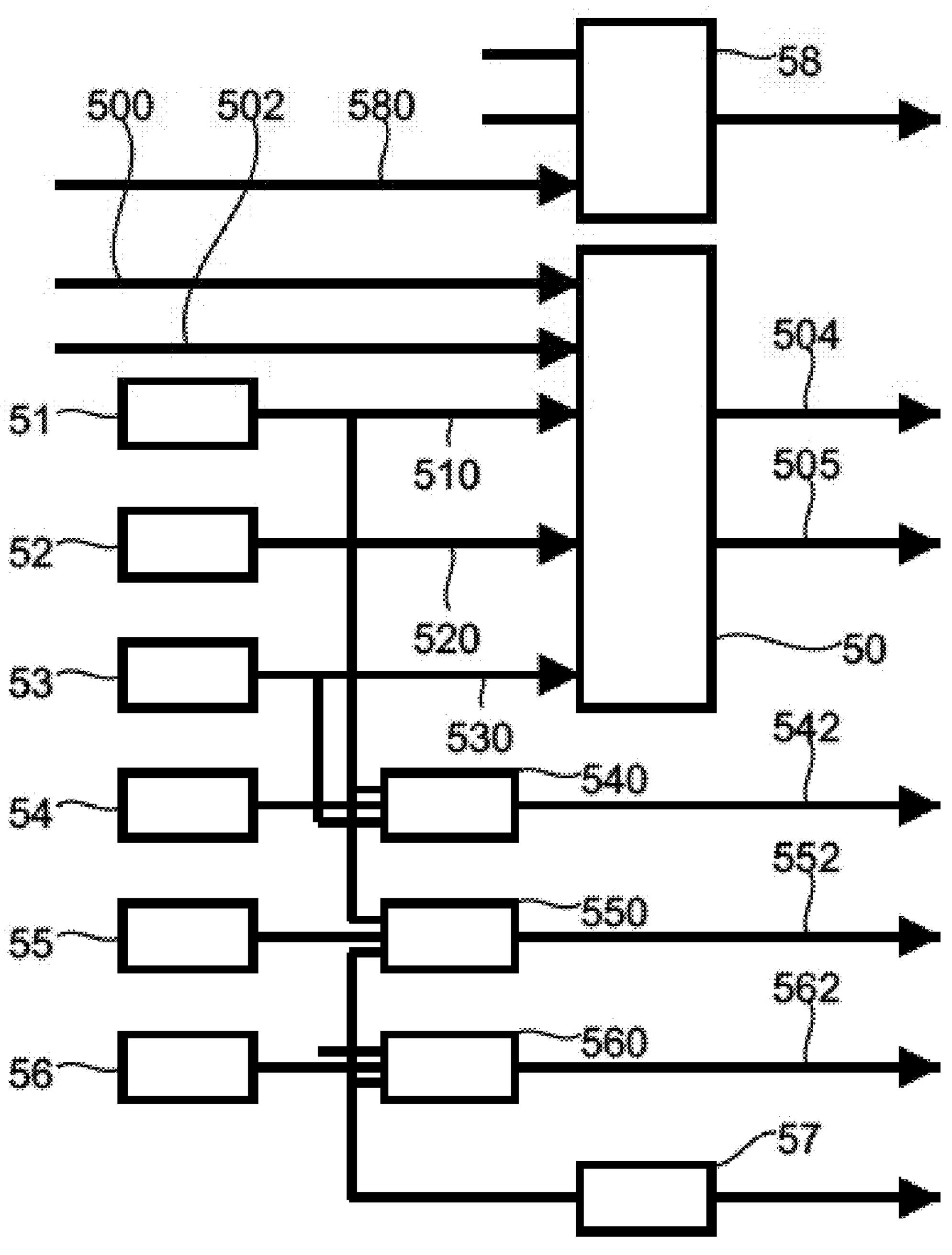
FIG. 4 illustrates an Electronic Computing Unit for vehicle motion control

Thus, in operation, longitudinal acceleration can be generated based on the longitudinal acceleration value from generic vehicle motion planner 10, adapted to vehicle specific circumstances that are not generically accounted for in generic vehicle motion planner 10. Feedback can be used in the vehicle specific vehicle motion control interface module 14*b*, using a feedback loop that does not contain generic vehicle motion planner 10. Of course, generic vehicle motion planner 10 may also provide for a form of feedback, wherein the planned vehicle trajectory is changed according to measured position and movement, so that generic vehicle motion planner 10 is part of this loop. But such a loop may have a slower response and larger deviations compared to the feedback loop that does not contain generic vehicle motion planner 10. The lateral motion controller in vehicle motion control interface module 14*b* uses the curvature value R of the planned vehicle trajectory from generic vehicle motion planner 10 to generate a steering angle D. The structure of the lateral motion controller in vehicle motion control interface module 14*b* may be similar to that of the longitudinal motion controller, applied to the lateral acceleration instead of the longitudinal acceleration, to compute a required steering angle from the curvature value of the vehicle trajectory. Feedback controller 46 of the lateral motion controller is configured to compute a steering correction based on the deviation between the path curvature of the planned vehicle movement and the measured path curvature. In FIG. 4 illustrates an Electronic Computing Unit (ECU) for Vehicle Motion Control (VMC), comprising a longitudinal motion controller 50, a lateral motion controller 58 as submodules of vehicle motion control interface module 14*b* in FIG. 1, a plurality of basic value estimators 51-56, a plurality of range estimators 540, 550, 560 as submodules of adaption control module 14*a* in FIG. 1 and a static vehicle parameter memory 57.

In the illustrated embodiment, the basic value estimators comprise a vehicle mass estimator 51 or vehicle mass distribution estimator 51, a road load estimator 52, a road slope estimator 53, a road friction estimator 54, a Center Of Gravity (COG) estimator 55, an understeer gradient estimator 56.

A sub-set of the plurality of basic value estimators 51-53 have outputs 510, 520, 530 coupled to longitudinal motion controller 50, which further receives inputs 500, 502 for receiving desired longitudinal speed 504 and acceleration values 505. This sub-set includes vehicle mass distribution estimator 51, road load estimator 52 and road slope estimator 53.

Another sub-set of basic value estimators 51-56 have outputs coupled to range estimators 540, 550, 560. The outputs 540, 550, 560 of range estimators 540, 550, 560 is used to supply feasibility information to generic vehicle motion planner 10 (not shown). In the illustrated embodiment, the range estimators include a maximum longitudinal acceleration estimator 540 with output 542, a maximum lateral acceleration estimator 550 with output 552, and a maximum rotation rate estimator 560 with output 562.

Maximum longitudinal acceleration estimator 540 is coupled to receive input from maximum longitudinal acceleration estimator 540 and vehicle mass (distribution) estimator 51 and road slope estimator 53. Maximum lateral acceleration estimator 550 is coupled to receive input from Center Of Gravity (COG) estimator 55 and vehicle mass (distribution) estimator 51, as well as some vehicle parameters e.g. from vehicle parameter memory 57. Maximum rotation rate estimator 560 is coupled to receive input from understeer gradient estimator 56.

Longitudinal motion controller 50 and lateral motion controller 58, are configured to translate desired velocity and acceleration values from their inputs 500, 502, 580 into motion control values, such as a torque value T. In the illustrated embodiment, longitudinal motion controller 50 performs this translation dependent on its inputs from the vehicle mass distribution estimator 51, road load estimator 52 and road slope estimator 53. A road vehicle is provided that comprises

- a powertrain, a brake system and a steering system;
- a generic vehicle motion planner configured to perform, during driving, planning of a vehicle movement trajectory as a function of time, satisfying one or more adaptable trajectory feasibility constraints;
- a vehicle motion control interface module configured to compute a drive control signal from a current acceleration defined by the vehicle movement trajectory and to use the drive control signal to control at least one of the powertrain, brake system and steering system;
- an estimator configured to estimate a vehicle configuration parameter value and/or a road configuration parameter at the location of the vehicle during driving;
- an adaptation control module configured to determine the one or more trajectory feasibility constraints based on the vehicle configuration and or road configuration parameter value, for use in the planning of the vehicle movement trajectory.

Thus, a generic vehicle motion planner may be used that is designed to plan the vehicle movement trajectory in a way that can be used for many different types of vehicle. The adaptation control module makes it possible to use the estimated vehicle configuration dynamically to set constraints on the trajectory to be planned without need to adapt the design of the generic vehicle motion planner. Optionally, the adaptation control module may use vehicle type specific parameters that remain constant during driving to do so as well.

The vehicle configuration parameter may be any property of the vehicle or part of the vehicle. It may represent vehicle mass, vehicle mass distribution, center of gravity, attitude of the vehicle's sprung mass, understeer gradient, vehicle attitude due to road slope etc, as well as vehicle parameters from which road conditions such as road friction and road load by the vehicle can be estimated. As used herein, vehicle motion parameters such as the current vehicle position, velocity and acceleration do not fall under the term vehicle configuration parameter.

In contrast, the generic vehicle motion planner may be configured to use non-vehicle configuration parameters such as a required travel direction, and a current position and velocity to plan the vehicle movement trajectory that satisfies the one or more adaptable trajectory feasibility constraints. The generic vehicle motion planner may use sensors to detect potentially colliding external objects, such as other vehicles or road boundaries, and plan the vehicle movement trajectory so as to avoid collisions with detected potentially colliding objects. In addition generic vehicle motion planner may use general traffic rules and destination information to plan the vehicle movement trajectory.

The adaptation of the constraints to vehicle configuration parameter values is especially useful for road vehicles with variable configuration such as in truck-trailer vehicles and/or in the case of significant mass changes with different loads in such vehicles.

The feasibility constraints may include a maximum feasible longitudinal and/or transversal acceleration as a trajectory feasibility constraint provided by the adaptation control module to generic vehicle motion planner. Alternatively or in addition, the vehicle dependent parameter value may be a maximum feasible yaw rate lateral as a trajectory feasibility constraint provided by the adaptation control module to generic vehicle motion planner.

The vehicle control interface module may be configured to switch between using different motors (e.g. an electromotor and a fuel motor). The adaptation control module may be configured to adapt the trajectory feasibility constraints according to such switching and/or control the switch.

In an embodiment one or more sensor devices may be used by the adaptation control module to determine vehicle configuration parameter values to set one or more constraints. Sensor devices may be used irrespective of whether their sensor results have a meaning only specific to a particular type of vehicle. This does not cause a need to adapt the design of the generic vehicle motion planner, because the adaptation control forms the trajectory feasibility constraints outside the generic vehicle motion planner.

The invention claimed is:

1. A road vehicle, comprising:

- a powertrain, a brake system and a steering system;
- a generic vehicle motion planner, configured to plan, during driving, a vehicle trajectory for the vehicle, subject to at least one feasibility constraint on one or more accelerations of the vehicle along the planned vehicle trajectory, and further configured to output plan based control information representing one or more planned dynamic vehicle control parameters according to the vehicle trajectory;

a vehicle control interface module configured to supply the drive control signals to at least one of the powertrain, brake system and steering system, based on the plan based control information, and an adaptation control module configured to use a vehicle dependent parameter value that is not used within the generic vehicle motion planner to determine the feasibility constraint information.

2. The road vehicle according to claim 1, the vehicle comprising a download interface, and wherein the vehicle adaptation control module is configured to determine the vehicle dependent parameter value on the basis of a parameter value downloaded by the download interface.

3. The road vehicle according to claim 1, wherein the vehicle dependent parameter value is a maximum feasible longitudinal acceleration provided as the feasibility constraint from the adaptation control module to the generic vehicle motion planner.

4. The road vehicle according to claim 1, wherein the vehicle dependent parameter value is a maximum feasible lateral acceleration provided as the feasibility constraint from the adaptation control module to the generic vehicle motion planner.

5. The road vehicle according to claim 1, wherein the vehicle dependent parameter value is a maximum yaw rate provided as the feasibility constraint from the adaptation control module to the generic vehicle motion planner.

6. The road vehicle according to any of the preceding claim 1, wherein the one or more planned dynamic vehicle control parameters include a planned longitudinal vehicle velocity, a planned longitudinal vehicle acceleration and a planned trajectory curvature.

7. The road vehicle according to claim 1, wherein the vehicle control interface module comprises a feedback loop configured to counteract a difference between an actual measured acceleration of the vehicle and the planned acceleration from the generic vehicle motion planner.

8. The road vehicle according to claim 1, wherein the vehicle control interface module is configured to use the plan based control information to select between using different motors of the vehicle for converting the plan based control information into the drive control signals and/or the adaptation control module is configured to use a selection of one of the different motors of the vehicle in the determination of the feasibility constraint information.

9. The road vehicle according to claim 1, further comprising an object sensor device for detection of potentially colliding objects, wherein the generic vehicle motion planner is coupled to the object sensor device and configured to determine a planned vehicle trajectory for the vehicle that avoids the potentially colliding objects based on geometric properties of the vehicle, subject to said at least one variable feasibility constraint.

10. An Electronic Computing Unit (ECU) comprising the adaptation control module and/or vehicle motion control interface of the road vehicle according to claim 1.

11. A set of road vehicles comprising the road vehicle according to claim 1 and at least one further road vehicle, wherein all road vehicles in the set comprise the identical generic vehicle motion planners and different types of road vehicles in the set comprise adaptation control module with different vehicle dependent parameter values for adapting automated driving control of the road vehicles in the set to the type of vehicle and/or to use of different vehicle dependent parameters.

12. A method of installing an automated driving system in a set of road vehicles comprising the road vehicle according to claim 1 and at least one further road vehicle, the method comprising installing identical generic vehicle motion planners in all road vehicles of the set, and adapting automated driving control of different types of road vehicles in the set to the different types by installing adaptation control module with different vehicle dependent parameter values.

13. The road vehicle according to claim 1, further comprising a sensor device and wherein the adaptation control module is configured to determine the vehicle dependent parameter value on the basis of a sensor result from the sensor device or further sensor devices.

14. The road vehicle according to claim 13, wherein the sensor device includes an accelerometer and/or a force sensor located on the vehicle or the further sensor devices include accelerometers and/or force sensors located respectively on different parts of the vehicle that are able to move relative each other.

15. A method of driving a road vehicle wherein the road vehicle comprises a vehicle control interface module, an adaptation control module and a generic vehicle motion planner distinct from each other, the method comprising:

the adaptation control module providing feasibility constraint information defining one or more feasibility constraints to the generic vehicle motion planner, using a vehicle dependent parameter value that is not used within the generic vehicle motion planner to determine the feasibility constraint information;

the generic vehicle motion planner determining a planned vehicle trajectory for the vehicle, subject to at least one variable feasibility constraint along the planned vehicle trajectory, the generic vehicle motion planner outputting plan based control information, the plan based control information representing at least a dynamic vehicle control parameter according to the planned vehicle trajectory;

the vehicle control interface module computing drive control signals at least one of the powertrain, brake system and steering system based on the plan based control information.

* * * * *